United States Patent [19]

Boucherie

[11] Patent Number: 5,533,791
[45] Date of Patent: Jul. 9, 1996

[54] BRUSH MAKING MACHINE

[75] Inventor: Bart G. Boucherie, Izegem, Belgium

[73] Assignee: G.B. Boucherie N.V., Izegem, Belgium

[21] Appl. No.: 431,322

[22] Filed: Apr. 28, 1995

[30] Foreign Application Priority Data

May 9, 1994 [GB] United Kingdom ............ 9409147

[51] Int. Cl.⁶ .................................................. A46D 3/04
[52] U.S. Cl. ........................ 300/4; 300/5; 300/7; 300/8; 264/243
[58] Field of Search .................... 300/2–11, 21; 264/243

[56] References Cited

U.S. PATENT DOCUMENTS

| | | |
|---|---|---|
| 3,910,637 | 10/1975 | Lewis, Jr. . |
| 4,696,519 | 9/1987 | Lewis, Jr. . |
| 4,904,025 | 2/1990 | Steinebrunner et al. . |
| 5,104,196 | 4/1992 | Boucherie ........................ 300/5 |
| 5,165,759 | 11/1992 | Lewis, Jr. . |
| 5,344,218 | 9/1994 | Weihrauch . |

FOREIGN PATENT DOCUMENTS

| | | |
|---|---|---|
| 0463217 | 1/1992 | European Pat. Off. . |
| 2511661 | 10/1975 | Germany . |
| 3735329 | 4/1989 | Germany . |
| 4027288 | 3/1992 | Germany . |

*Primary Examiner*—Mark Rosenbaum
*Attorney, Agent, or Firm*—Sixbey, Friedman, Leedom & Ferguson; Gerald J. Ferguson, Jr.

[57] ABSTRACT

A brush making machine with a mold for injection molding of brush bodies is disclosed. The mold comprises a stationary mold part, a movable mold part and a pair of insert parts fitting into a recess of the movable mold part. The insert parts have tuft insertion holes therein. While one of the complementary mold parts fills the recess of the movable mold part and brush bodies are injection molded with tufts of bristles embedded in the molding material, the other insert part is in a tuft loading station for introducing tufts of bristles into the tuft insertion holes. The tuft feeder comprises movable tuft carriers which carry sets of tufts from the bristle containers to the mold. A robot is provided for moving the carriers between the mold and the bristle containers.

15 Claims, 10 Drawing Sheets

BRUSH MAKING MACHINE

The present invention relates to a brush making machine which comprises a mold for injection molding brush bodies having tufts of bristles embedded in the molding material.

In a brush making machine for tooth brushes which is disclosed in EP 0 463 217 A1, the tooth brush bodies are molded in a mold composed of three mold parts wherein one of the mold parts is stationary, a second mold part is movable towards and away from the first mold part to close and open the mold cavity and the third mold part fits into a recess of the second mold part to complete the cavity defining surface of the second mold part in the region of the brush head. A pair of third mold parts are mounted on the ends of a two-armed carrier which performs a combined pivotal and reciprocating movement to bring one of the mold parts to a position fitting into the recess of the second mold part while the mold part on the end of the other arm of the carrier is in front of a tuft feeder, and vice versa. The tuft feeder feeds a plurality of strands of fibres into a number of tuft insertion holes provided in the mold part in a pattern corresponding to the desired tuft pattern of the brush to be produced. The strands of fiber are advanced to the tuft insertion holes, so that their ends project into the mold cavity partially defined by the mold part. The ends of the fibres are then exposed to heat to form individual knobs at the inner end of each tuft of fibres, so that the tufts will be firmly anchored in the molding material flowing around the knob portions. The strands of fibres are then severed, and the mold part with the tufts of fibres, or bristles, therein is moved to the mold wherefrom a finished tooth brush is simultaneously ejected. Thus, while a tooth brush is being molded, the production of the next tooth brush is prepared by inserting tufts of bristles into one of the two mold parts having tuft insertion holes. After the molding of the brush has been completed, further finishing operations are required to round and polish the ends of the bristles, and eventually, to provide the bristles with a desired contour or shape.

The use of tuft picking tubes in the production of tooth brushes has already been devised in EP 0 567 672 A1, for example. In the method disclosed therein, however, a base member with a pattern of tuft insertion holes is required which becomes part of the finished brush body. It is not possible to produce the brush body in a single molding step.

Picking out individual tufts of bristles from a package wherein the bristles are held in a parallel compressed state is a delicate operation. When the tubes are advanced with their front ends against the pre-finished ends of bristles in the package, some of the bristles may easily penetrate into the channel defined by a respective tube, but others will abut the edge of the tube and buckle, preventing further penetration of the tube into the package. Different methods have been proposed to assist the penetration of picking tubes into a package of bristles. In EP 0 567 672 A1 picking tubes with a beveled front end are shown. In DE 40 27 288 A1 tuft picking tubes are shown which have a narrow neck portion on their front end and a wider internal channel. In U.S. Pat. No. 5,165,759 the penetration of the picking tubes is assisted by a vibrating or oscillating plate which engages the rear ends of the bristle fibres to move them in directions parallel to their length. These methods may be more or less successful, but they are of insufficient reliability for use with a mold, the tuft insertion holes of which must be filled with tufts of bristles to prevent leakage of molding material out of the mold cavity.

The present invention provides a brush making machine which allows brushes to be produced at a high efficiency with a variety of tuft compositions and configurations, including different types of fibres and contoured shapes of the bristles, without requiring additional finishing operations.

According to the invention, a brush making machine is provided which comprises a mold for injection molding brush bodies, in particular of tooth brush bodies, having tufts of bristles embedded in the molding material. The mold comprises a mold part having a cavity defining surface portion with tuft insertion holes therein arranged in a pattern corresponding to the desired tuft pattern of the brush to be produced. A tuft feeder is provided for introducing tufts of bristles into the tuft insertion holes, so that the bristles have one end projecting into the mold cavity. The tuft feeder comprises a plurality of tuft picking stations. Each tuft picking station has an associated bristle container containing different pre-finished bristles in a parallel packed relationship, and an associated tuft picker with a set of tuft picking tubes. A plurality of tuft carriers are provided which are movable between each of the tuft picking stations for carrying to the mold tufts of bristles picked out from the bristle containers by the picking tubes. With this configuration of the brush making machine, each set of tufts in a tooth brush can be composed from different types of bristles by selection from an appropriate one of the bristle containers. A large variety of tooth brush designs can be produced in an automated and highly efficient manner. The tuft picking tubes in each carrier can be sequentially filled with tufts of bristles by passing through the plurality of tuft picking stations while a molding cycle is performed by the mold. Thus, although complex designs of tuft patterns can be produced, a complete set of tufts is always available at the time the molding machine requires a new supply of tufts to start the next molding cycle. Operation of the machine is nearly continuous and, therefore, very efficient. Since there is no limitation to the number of tuft picking stations, any composition of tufts in the brushes to be produced is possible.

In the preferred embodiment, the carriers are sequentially moved through each of the tuft picking stations by being releasably connected in a closed loop to a common indexing drive. Each carrier leaving the last one of the tuft picking stations passes to a carrier exchange station where each carrier with filled tuft picking and transfer tubes is exchanged for a carrier with empty tuft picking and transfer tubes. If a robot is used for removing a carrier with emptied tuft picking and transfer tubes from the tuft loading station, grasping a carrier with filled tubes in the exchange station, leaving the carrier with emptied tubes in the exchange station and moving the carrier with filled tubes to the tuft loading station, the tuft feeder can be a unit separate from the molding machine.

According to one embodiment of the invention, the tuft picking and transfer tubes are held in a carrier permitting independent axial shifting of the tubes upon penetration into the bristle container. The carrier is provided with releasable clamping means for clamping the tubes in fixed positions during transfer of tufts into the molds. Thus, in the initial phase of penetration of the tubes into the package of bristle fibres, each tube is free to advance into the package independent of all other tubes, and the tubes are not simultaneously forced into the package. Some of the tubes may have penetrated an initial distance into the package, while others have been rejected by abutment of their front edge against the ends of the bristle fibres. A further improvement is achieved by driving the tubes into the package with a plurality of successive initial strokes, whereby each tube is repeatedly advanced, so that the front end thereof penetrates into the bristle container only a fraction of bristle length until a tuft of bristles is engaged therein, and with a further, or final stroke for advancing the tubes further into the bristle container only when all of the tubes have a tuft of bristles engaged therein. Thereafter, the clamping means is activated and the tubes are fixed in position for transfer of the tufts to the mold.

Penetration of the tubes into the pack of bristle fibres may be further assisted by frictionally engaging the rear ends of the fibres with a plate vibrating in a direction transverse to the length of the bristles. The successive strokes of the tubes are preferably produced by a reciprocating pusher member engaging the rear ends of the tubes. The pusher member may be configured to engage selected ones of the tube at a time, the remaining tubes being thereafter engaged by a different pusher member to drive the tubes into another bristle container with bristles of a different type, for example, differently coloured bristles.

According to a preferred embodiment, the picking tubes are initially driven with their front ends into the package of bristles only a small fraction of bristle length while the bristle ends facing away from the tubes are frictionally engaged by a plate vibrating in a direction transverse to the length of said bristles, and completely driven into the package of bristles with a final stroke when each tube has a tuft of bristles engaged in its front end. Penetration of bristles into the tubes is preferably assisted by a combined vibrational and tapping movement of the vibrating plate.

The tuft picking operation is greatly facilitated by using a particular type of bristle container provided by the present invention. The bristle container has a flexible band engaged around a pack of bristles. Preferably, the flexible band forms a generally U-shaped loop into an open side of which a movable pressure member is engaged to maintain the bristles under constant pressure. After each set of tufts has been picked out of the container, the pressure member is pushed further into the container to compensate for the diminishing volume of the package. The flexible band allows the package to slightly move in all directions transverse to the length of the fibres in response to penetration of the picking tubes.

When the package of fibres has been reduced in the container to a predetermined amount, the container needs to be refilled. Refilling of the container can be done continuously or, preferably, in a combined bristle processing and bristle container refilling device.

Further features and advantages of the invention will stand out from the following description with reference to the drawings. In the drawings.

Figure 1:
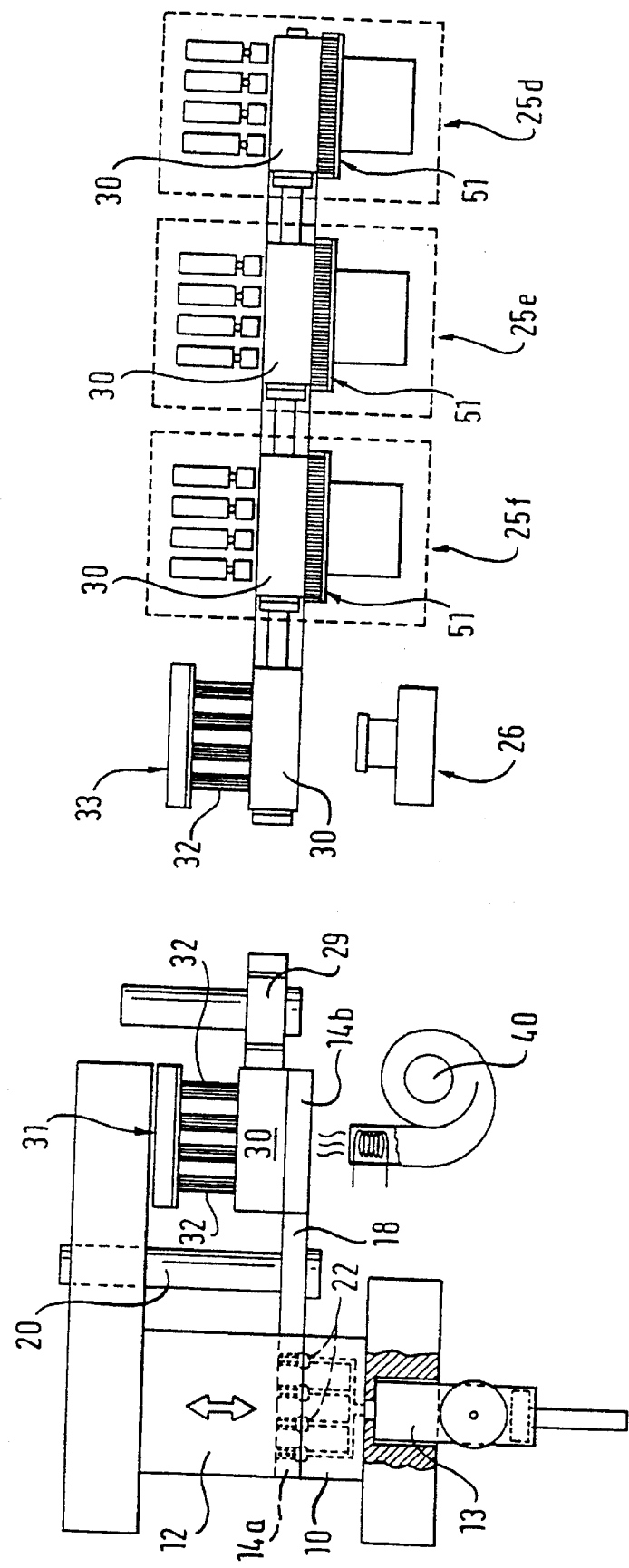
FIG. 1 shows a schematic side view of a mold with a tuft feeder.
Figure 2:
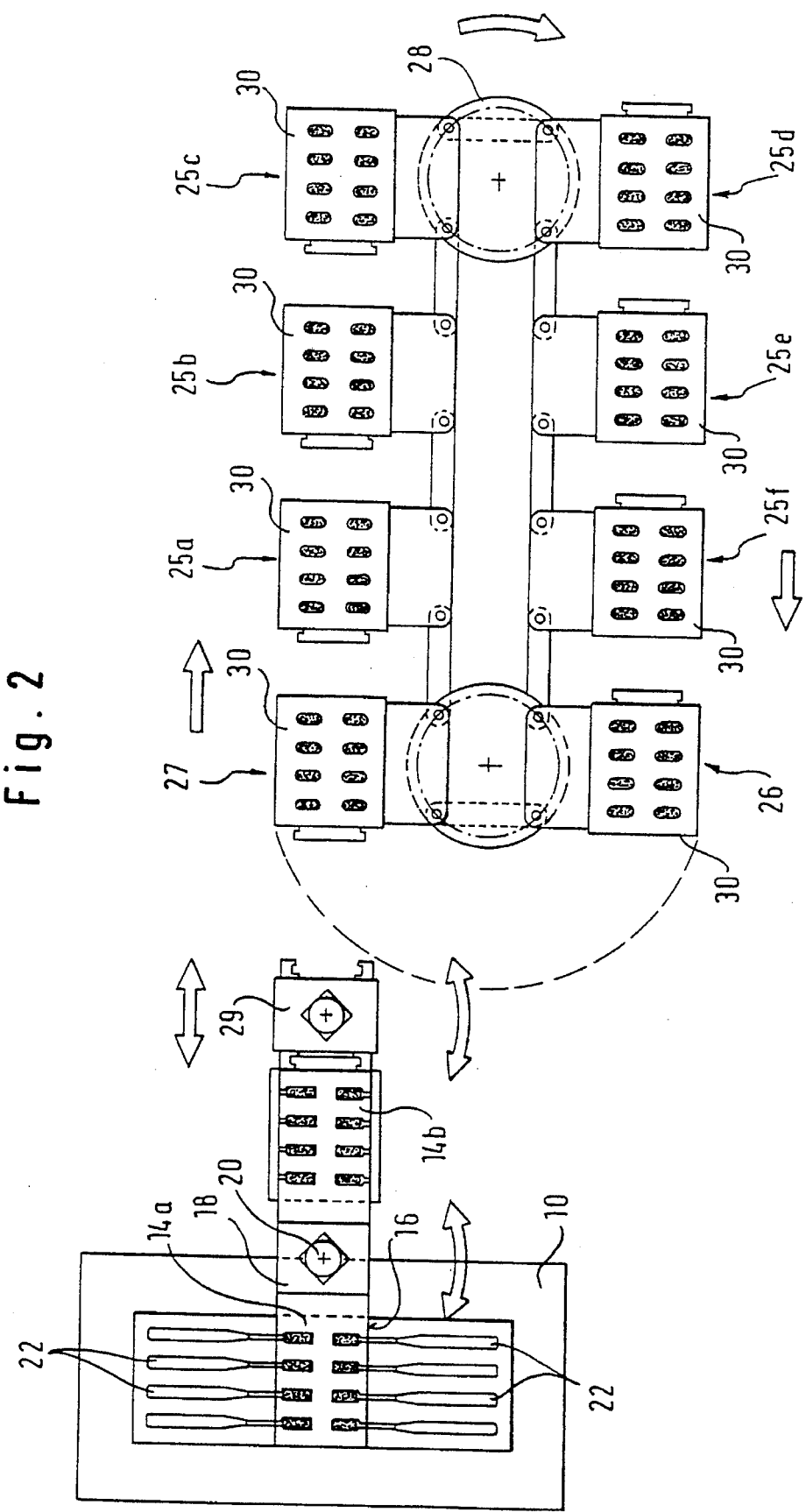
FIG. 2 is a schematic plan view of the mold and tuft feeder.

FIGS. 1 and 2 of the drawings show the main components of a brush making machine designed for producing tooth brushes. One of these components is a mold composed of a first, stationary mold part 10, a second, movable mold part 12, an injection device 13 and a pair of insert parts 14a, 14b fitting into a recess 16 of the second mold part 12. The complementary mold parts 14a, 14b are connected to the ends of a two-armed lever 18 which is mounted for pivotal and reciprocating movement about and along a vertical axis 20. The mold parts 10, 12 and 14a (or 14b) define a plurality of closely spaced, similar mold cavities 22 having the shape of a tooth brush body to be molded. The insert parts 14a, 14b have a cavity defining surface corresponding to the head portion of a tooth brush and, in particular, to the side of the head portion from which the bristles project after completion of the molding process. The insert parts 14a, 14b are thus provided with a plurality of sets of tuft insertion holes 24 (FIG. 7) extending through the insert part and opening into the cavity portion 22a defined therein. As can be seen in FIG. 2, either one of the insert parts 14a, 14b is movable into a position fitting into the recess 16 of the mold part 12, the other insert part being then in a position ready for receiving sets of fibre tufts to form the bristles of the tooth brushes.

Figure 3:
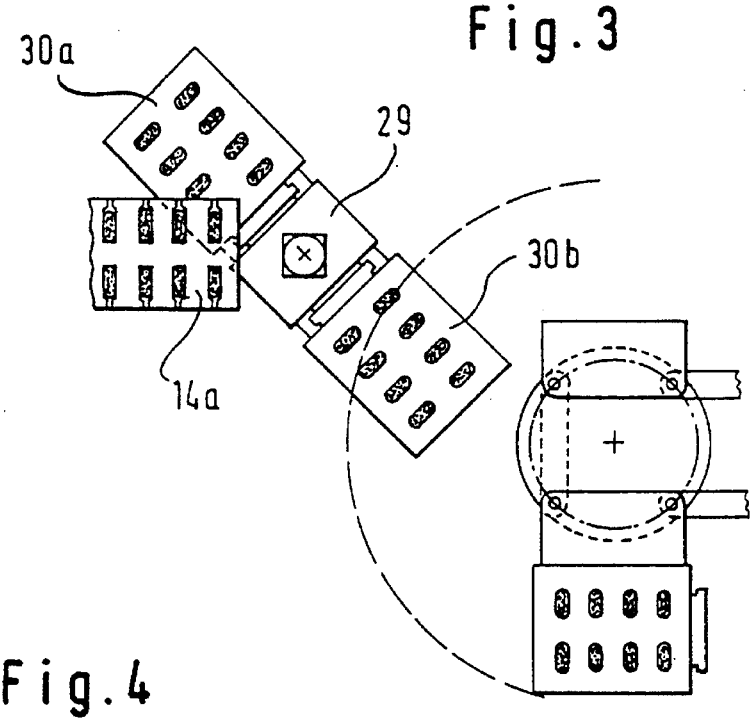
FIG. 3 is a partial plan view showing a robot in an intermediate position.

The brush making machine comprises a tuft feeder as a separate unit. The tuft feeder comprises a total of six tuft picking stations 25a, 25b, . . . 25f. Further provided are an inspection station 26 and a carrier exchange station 27. The tuft picking stations 25a, 25b, . . . 25f, the inspection station and the carrier exchange station 27 are arranged along the periphery of a closed loop indexing drive 28. Carrier cassettes 30 which will be disclosed more in detail with reference to FIGS. 5 and 6 are releasably connected to the indexing drive 28. The number of cassettes 30 shown in FIG. 2 is eight, which is the total number of stations present in the tuft feeder. In each tuft picking station 25a, 25b, 25f, tufts of bristles are picked from an associated bristle container 51, in a manner to be disclosed more in detail with reference to FIGS. 5 and 6. Each cassette 30 holds a number of sets of tuft insertion and transfer tubes 32 corresponding to the number of mold cavities 22 defined by mold parts 10 and 12. The bristle containers 51 in each station contain pre-fininshed bristles which may, but must not necessarily, be different from one station to another. For example, the bristle containers can contain bristles of different colour, material, stiffness or any other property. While a total number of six tuft picking stations 25a, 25b, . . . 25f is shown in FIG. 2, it should be understood that the tuft feeder may comprise any desired number of stations. The functional link between the tuft feeder shown on the right-hand side and the molding machine shown on the left-hand side in FIGS. 1 and 2 is a robot 29, the purpose of which is to remove a carrier 30a (FIG. 3) with emptied tuft picking and transfer tubes 32 from a tuft loading station 31 in the molding machine, to grasp a carrier 30b with filled tubes in the exchange station 27, to leave the carrier with emptied tubes in the exchange station 27 and to move the carrier 30b with filled tubes to the tuft loading station 31. As seen in FIGS. 2 and 3, the robot 29 performs a combined rotary and translational movement between the tuft feeder and the molding machine. Since the number of cavities 22 in the mold parts 10, 12 is eight in this example, each carrier cassette 30 carries eight sets of tuft picking and transfer tubes 32. The tubes 32 are held in the carrier cassette 30 in a manner to allow relative shifting movements in the axial directions of the tubes, but a clamping mechanism with a clamping plate 34 is provided to clamp the tubes 32 in fixed positions with respect to the carrier cassette 30. Each set of tuft picking and transfer tubes 32 is arranged in the carrier cassette 30 in a pattern corresponding to the pattern of the tuft insertion holes 24 in the mold parts 14a, 14b.

Figure 4:
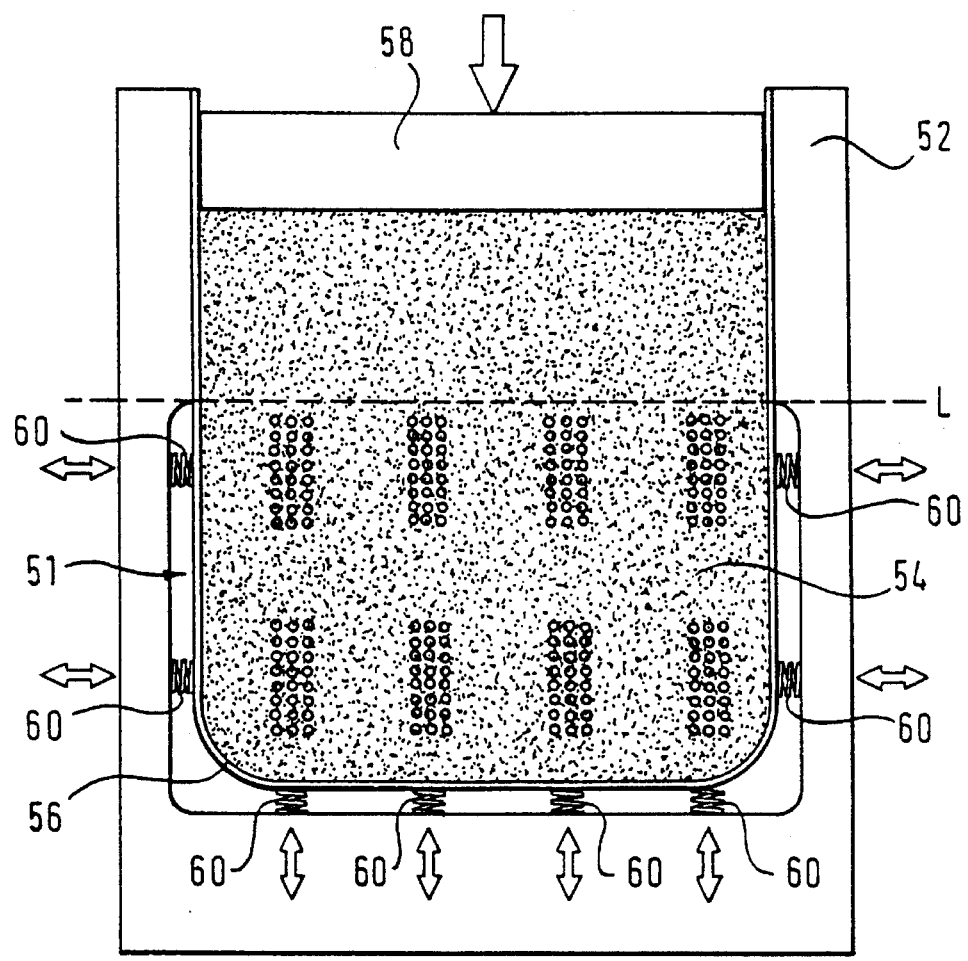
FIG. 4 is a schematic side view of a bristle container.

In the tuft picking stations, a particular type of bristle container is used. The bristle container is shown in FIG. 4. As seen in FIG. 4, the container 51 comprises a generally U-shaped frame 52, the upright legs of which define a generally rectangular space for accommodation of a package of parallel pre-finished bristles (or fibres) 54. A flexible band 56 is engaged about the package of bristles 54. The upper ends of the flexible band 56 are held on the inner sides of the upright legs of the frame 52. The flexible band 56 is also generally U-shaped, with an open upper end which is closed by a pressure block 58. The pressure block 58 maintains the bristles 54 under a substantially constant pressure. When tufts of bristles are picked out from the package, the pressure block 58 is lowered to compensate for the reduction in volume of the package. The flexible band 56 allows for a limited lateral movement of the package of bristles 54 in the lower portion thereof. The lower part of the flexible band 56 is additionally supported by three resilient supporting members 60, such as pressure springs engaged between the outer surface of the band 56 and a recessed wall portion of the frame 52.

Figure 5A:
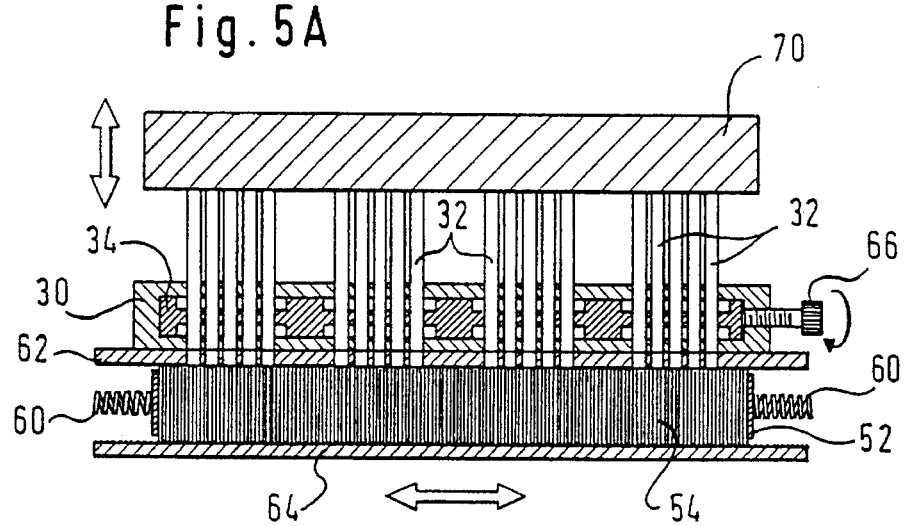
FIG. 5A, 5B and 5C show different phases of picking tube penetration into a bristle container.
Figure 5B:
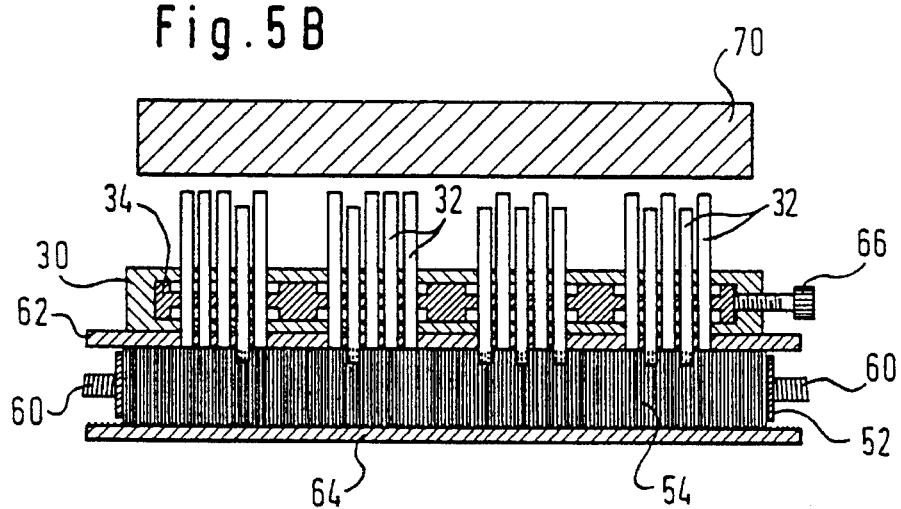
Figure 5C:
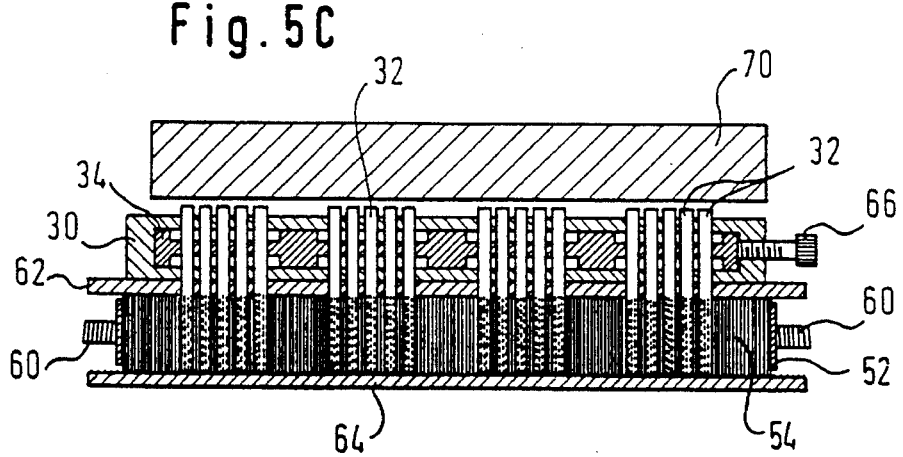

FIG. 5A–5C shows the bristle container in an operative position adjacent a carrier cassette 30 with some of the tuft picking and transfer tubes 32. A plate 62 provided with through openings aligned with the tubes 32 is located between the carrier cassette 30 and the package of bristles 54. On the side opposite the plate 62, the rear ends of the bristles 54 are frictionally engaged by a vibrating plate 64, the vibrating movement of which is parallel to its plane.

The carrier cassette 30 comprises a pair of spaced front and rear walls with aligned openings slidingly accommodating the tubes 32. The clamping plate 34 is located in the space defined within the front and rear walls of the carrier cassette 30. The clamping plate 34 is likewise provided with openings through which the tubes 32 extend. The tubes 32 are normally free to slide in the carrier cassette 30 in the direction of their length. However, when a lateral force acts on the clamping member 34, which can be produced by rotation of a clamping screw 66, the tubes 32 are clamped and fixed in position with respect to the carrier cassette 30.

As further seen in FIG. 5A–5C, a pusher block 70 is provided. The pusher block 70 engages the rear ends of the tubes 32 and performs repeated reciprocating pushing strokes tending to advance the forward ends of the tubes 32 to slightly penetrate into the package of fibres 54. In an initial phase of the tuft picking process, the pusher block 70 repeatedly pushes the forward ends of the tubes 32 over a short distance of some 1 or 2 mm into the package of bristles 54. Some of the tubes 32 will readily engage around a tuft of bristles penetrating into the internal channel of the tube, the surrounding bristles being spread by the forward edge of the tube. When the pusher block 70 retracts from the rear ends of the tubes 32, those tubes that have found a way into the package of bristles 54 will remain engaged in the package, but the remaining tubes will return to their initial position, being rejected by abutment on the front ends of the bristles. As is readily understood, such return movement of the tubes 32 is permitted because the tubes are free to shift in the openings of the carrier cassette 30 independent of each other. To assist penetration of the tubes 32 into the package of bristles 54, the plate 64 performs a vibrating movement, so that the bristles are slightly moved in the package 54 in a direction transverse to their length. FIG. 5B shows an initial state of the tuft picking process where two of the tubes 32 have already found their way into the package of bristles 54 and three further tubes 32 have been rejected and returned to their initial positions. However, after a limited number of pushing strokes by the pusher block 70, all of the tubes 32 will have penetrated some distance into the package of bristles 54. At that time, the pusher block 70 performs a final further stroke whereby the tubes 32 are fully pushed through the package of bristles 54 until they abut an end plate 72 now replacing the vibrating plate 64. The clamping screw 66 is rotated to engage the clamping plate 34, so that the tubes 32 are fixed in position with respect to the carrier cassette 30. The pusher block 70 is retracted and the tubes 32 can be withdrawn from the package of bristles 54, with tufts of bristles remaining engaged in the internal channels of the tubes 32.

Figure 6A:
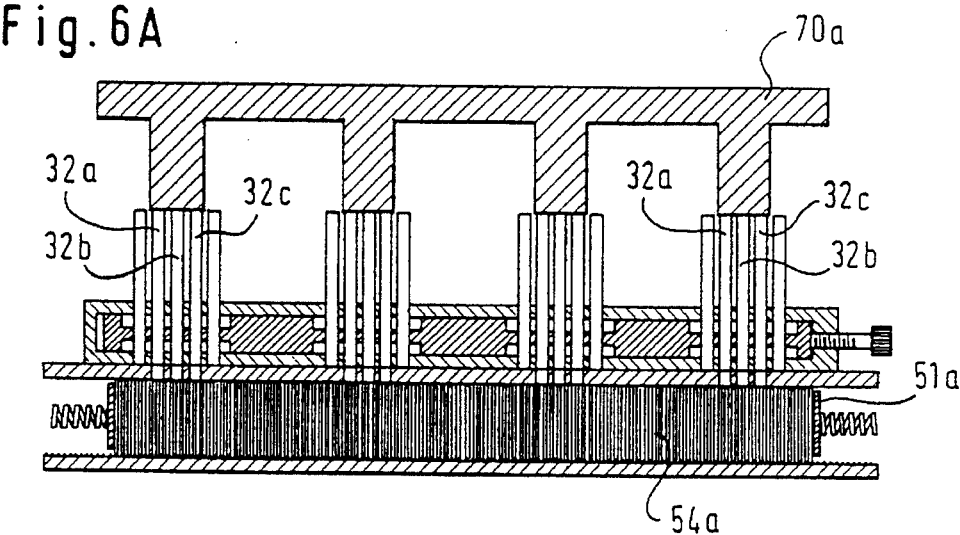
FIGS. 6A and 6B illustrate selective picking of bristles from a container.
Figure 6B:
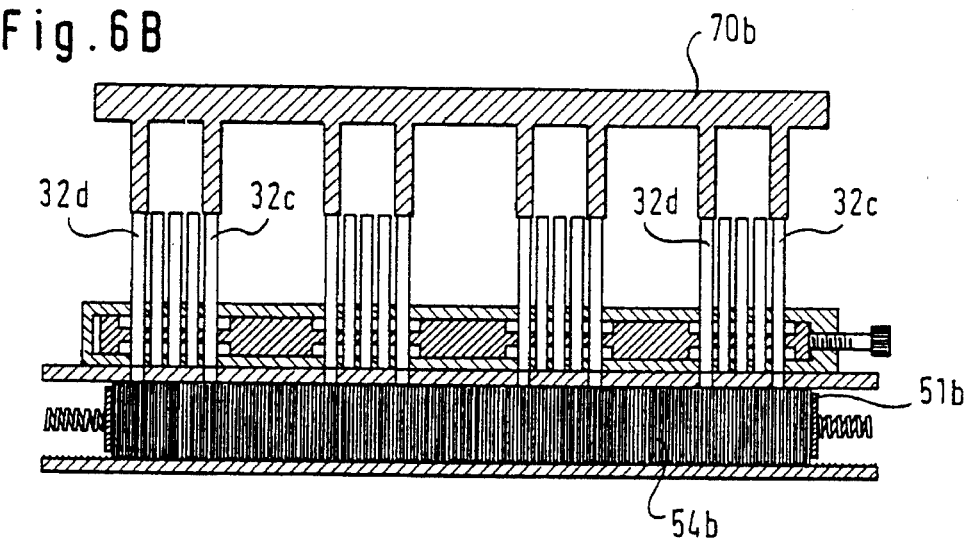

In each of the tuft picking stations 25a, 25b, . . . 25f, as illustrated by way of example in FIGS. 6A and 6B, a different pusher block 70 or 70b is used. The pusher block 70a will selectively engage only a first fraction in each set of tubes, referenced 32a, 32b and 32c in FIG. 6A. The remaining tubes 32d and 32e of each set will be engaged by the pusher block 70b in a following tuft picking station. In the tuft picking station illustrated in FIG. 6A, bristles 54a of a first type are picked out from a first bristle container 51a, and in the second tuft picking station shown in FIG. 6B, a second type of bristles 54b are picked from a second bristle container 51b. As is readily understood, any number of bristle types can be combined in this manner to produce a wide variety of tooth brushes.

By sequentially passing through the tuft picking stations 25a, 25b, . . . 25f, each carrier 30 has its tuft picking and transfer tubes 32 selectively filled with tufts of bristles from the respective bristle container 51. A carrier leaving the last tuft picking station 25f should have each of its tubes filled with the appropriate type of bristles. In the following station, the inspection station 26, each of the tuft picking and transfer tubes 32 is inspected for detection of any missing, incomplete or otherwise defective tufts. A defective carrier can be discarded or, in the preferred embodiment, corrected by means of some correcting device 33 proceeding with the appropriate corrective action.

As the next step, a carrier 30 with complete sets of bristles is presented to the robot 29 in the exchange station 27. This completes the operating cycle of the tuft feeder, wherein a particular carrier cassette passes through each station. The tuft picking stations 25a, 25b, . . . 25f, the inspecting station 26, and, in case of need, the correcting device operate simultaneously.

Figure 7:
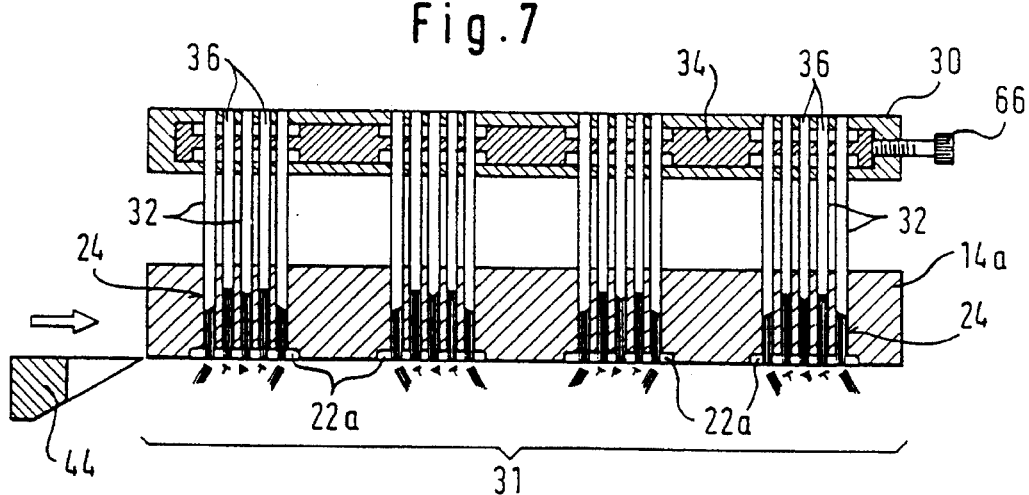
FIG. 7 shows a mold part with tufts of bristles inserted therein.

When a carrier cassette 30 with new tufts of bristles is presented to the tuft loading station 31 in the molding machine, it is released from the robot 29 and taken over by the tuft loading station 31. As shown in FIG. 7, plunger members 36 are now introduced into the rear ends of the tubes 32 to push the tufts of bristles contained therein through the holes 24 in the insert part 14a (or 14b). As is further seen in FIG. 7, the plunger members 36 can be advanced different lengths, so that the tufts of bristles have their outer ends at different levels with respect to the cavity defining surface portion 22a of the insert part 14a. Any excess length of tuft fibres projecting into the cavity can now be trimmed off by using a cutter 44. In addition, as also seen in FIG. 7, the forward ends of the plunger members 36 can be shaped to provide the outer ends of the tufts with a desired profile.

A heating device 40, for example a hot air blower, is provided to project a stream of hot air against the ends of tuft fibres inserted through the holes 24 and projecting into each cavity portion 22a. The purpose of heating the fibre ends is to partially melt the material of the fibres to form individual knobs of fibre material or, eventually, a more or less continuous base of fibre material, that will be embedded in the molding material in the course of the molding step.

While a set of tufts is being loaded into an insert part 14b (or 14a) in the tuft loading station 31, a set of tooth brushes is molded with the other insert part 14a (or 14b) and a set of bristles contained in each set of tuft insertion holes 24. After completion of a molding cycle, the mold opens by lifting of movable mold part 12, the insert part 14a is removed from the recess 16 in the mold part 10, the finished tooth brushes are ejected from the cavities 22, and the lever 18 is rotated 180 degrees to exchange one of the insert parts 14a, 14b for the other in the mold and in the tuft loading station 31.

Figure 8:
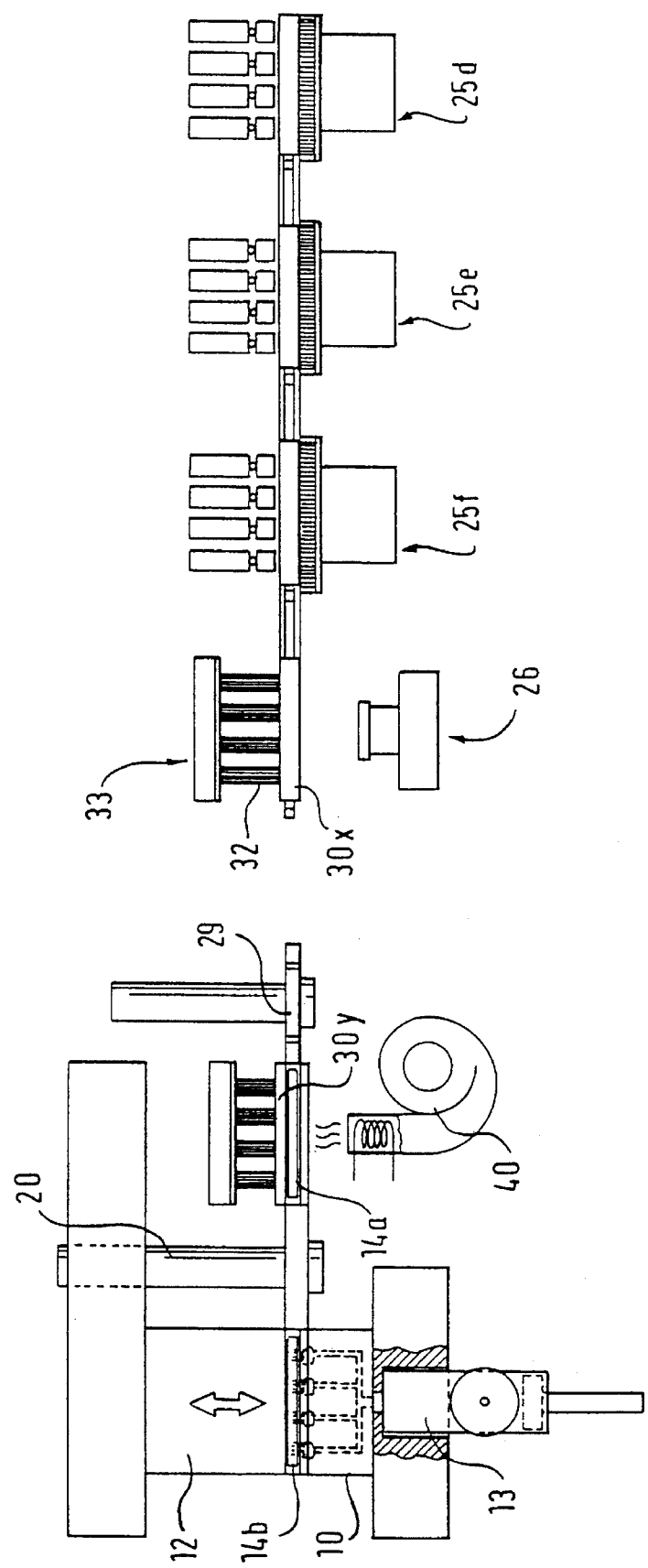
FIG. 8 shows an alternative embodiment of the mold and tuft feeder.

In the alternative embodiment of the machine shown in FIG. 8, each mold insert part 14a, 14b is releasably connected to a carrier cassette 30, so that each tuft insertion hole 24 is aligned with a corresponding tuft insertion and transfer tube 32. The carrier cassette 30 and mold insert part 14a (or 14b) remain connected with each other in this way during passing though the tuft picking stations 25a, 25b, ... 25f and through the tuft loading station 31, but are disconnected from each other before the insert part 14a (or 14b) is moved to the mold.

Figure 9:
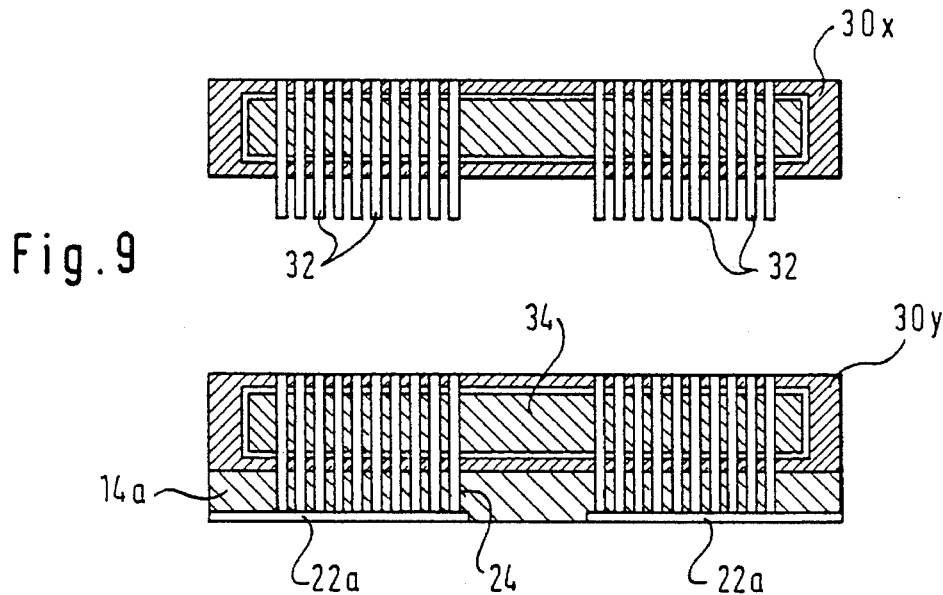
FIG. 9 shows a mold insert part with a carrier cassette according to the alternative embodiment.

FIG. 9 shows a first carrier cassette 30x separated from and a second carrier cassette 30y connected to an insert part 14a. This embodiment facilitates introduction of tufts into the tuft insertion holes 24, but an additional number of similar mold insert parts is required.

Figure 10:
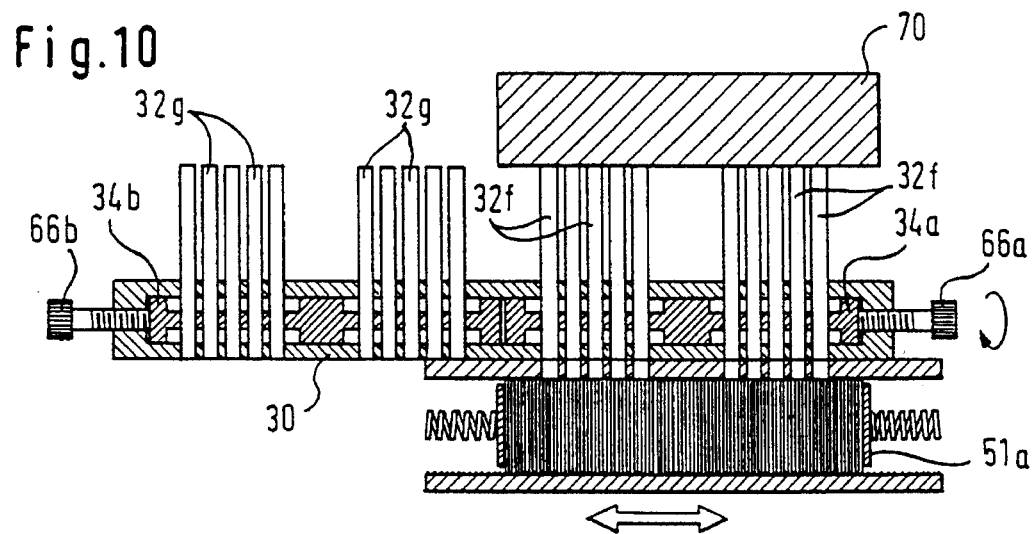
FIG. 10 shows an alternative embodiment of a tuft picking station before picking of bristles.
Figure 11:
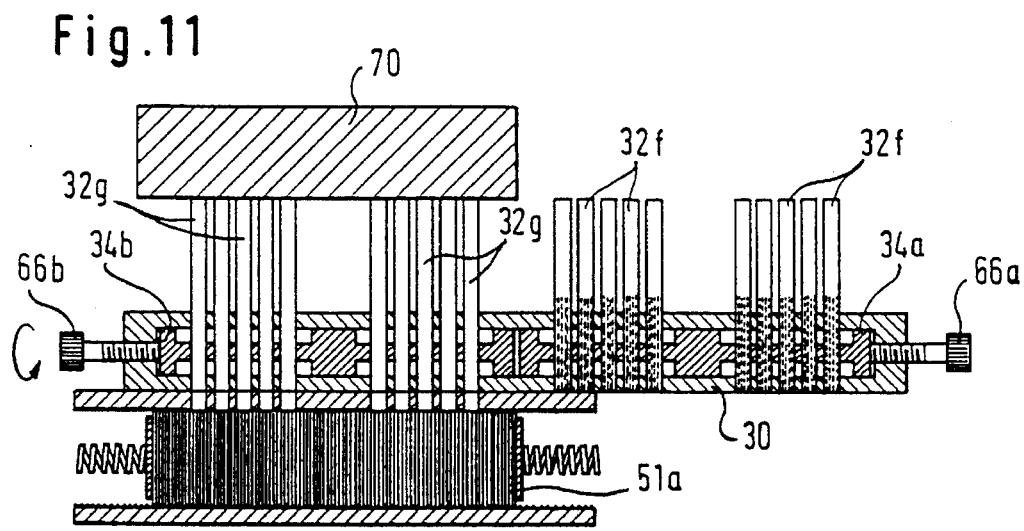
FIG. 11 shows the tuft picking station after picking of bristles with only a fraction of the tubes.

In the embodiment shown in FIGS. 4, 5a and 5b, all sets of tuft picking tubes 32 of one carrier cassette 30 can be filled simultaneously with bristles from a single bristle container 51. This requires a bristle container of considerable dimensions. In the embodiment of FIGS. 10 and 11, a smaller bristle container can be used. In this emdodiment, the dimensions of the bristle container 51a are sufficient to present bristles to only half of the sets of tuft picking and transfer tubes 32. As seen in FIG. 10, the bristle container 51a is in front of the tubes 32f only but, as seen in FIG. 11, can be moved to the other half of tubes 32g. Since the tubes 32f and 32g are separately filled with bristles from the bristle container 51a in the manner disclosed before with respect to FIGS. 5A, 5B and 5C, each group of tubes 32f and 32g has its own clamping member 34a and 34b, respectively, and its own clamping screw 66a and 66b, respectively.

With reference to FIGS. 10 and 11, a preferred embodiment of the tuft picking device will be described.

Figure 12:
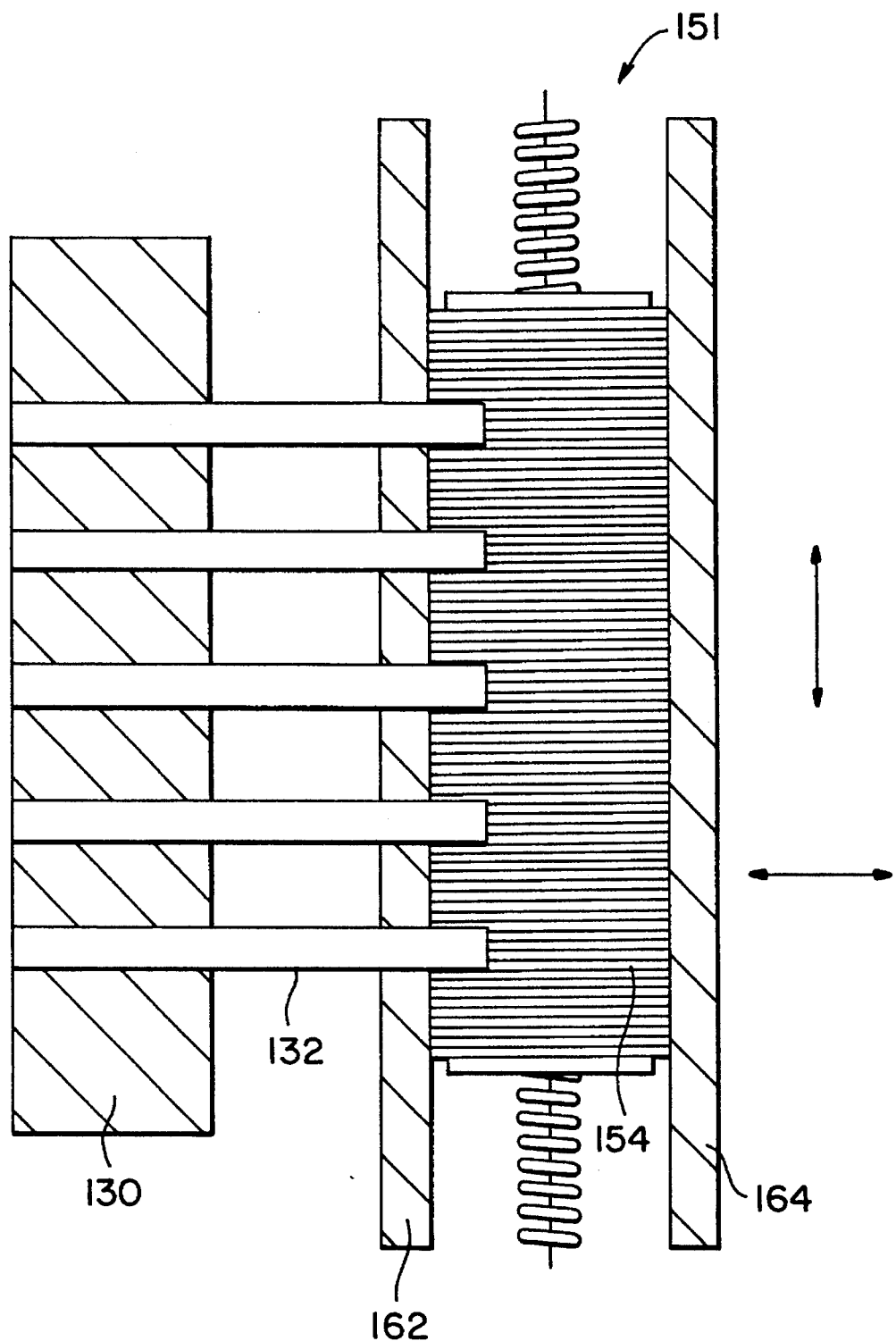
FIG. 12 illustrates a tuft picking operation according to a preferred embodiment.

In FIG. 12 the tuft picking tubes 132 are fixed in a carrier block 130. Plate 162 is slidably held on the carrier block 130 so that plate 162, which has through holes for the picking tubes 132, can slide on these tubes in a manner apparent from the drawings. In the condition shown in FIG. 12, plate 162 abuts the front ends of the bristles 154 contained in the bristle container 151. As before, the rear ends of the bristles 154 are engaged by vibrating plate 164. The picking tubes 132 have their front edges aligned in the plane of plate 162.

As seen in FIG. 12, block 130 with the picking tubes 132 is now advanced so that the front ends of the picking tubes 132 penetrate into the package of bristles a short distance, which is a small fraction of the bristle length, while plate 164 is continuously vibrating. Plate 162 has retracted from the front edges of the picking tubes 132 by sliding on the tubes. The distance of initial penetration of the picking tubes 132 into the package of bristles 154 depends on the length and thickness of the bristles. For producing tooth brushes, an appropriate distance would be 2 to 3 mm.

The picking tubes 132 remain in this advanced position for a short period of time, 0.5 to 5 seconds, for example, depending on the size and nature of the bristles, while plate 164 continues vibrating. As is easily understood, in the initial phase of picking tube penetration into the package of bristles, some of the bristles will abut the front edges of the tubes and buckle. However, due to the continued vibration of plate 164, most of the bristles will align inside or outside of the openings in the picking tubes.

To ensure that all bristles will be properly aligned and no bristles will remain in abutment on the front edges of the picking tubes, plate 164 now performs a combined vibrational and tapping movement. The combined vibrational and tapping movement of plate 164 is performed for a short period of time, several seconds, for example.

When all bristles are properly aligned inside or outside of the picking tubes, the vibrational and tapping movement of plate 164 is stopped, and this plate is replaced with a reaction plate. The reaction plate has a smooth alignment face presented to the rear ends of the bristles 154 in the package.

The picking tubes 132 are now further advanced and driven into the package of bristles until their front edges abut the reaction plate, with a final picking stroke.

Thereafter, the picking tubes are withdrawn from the package of bristles with tufts of bristles entrained therein.

Figure 13:
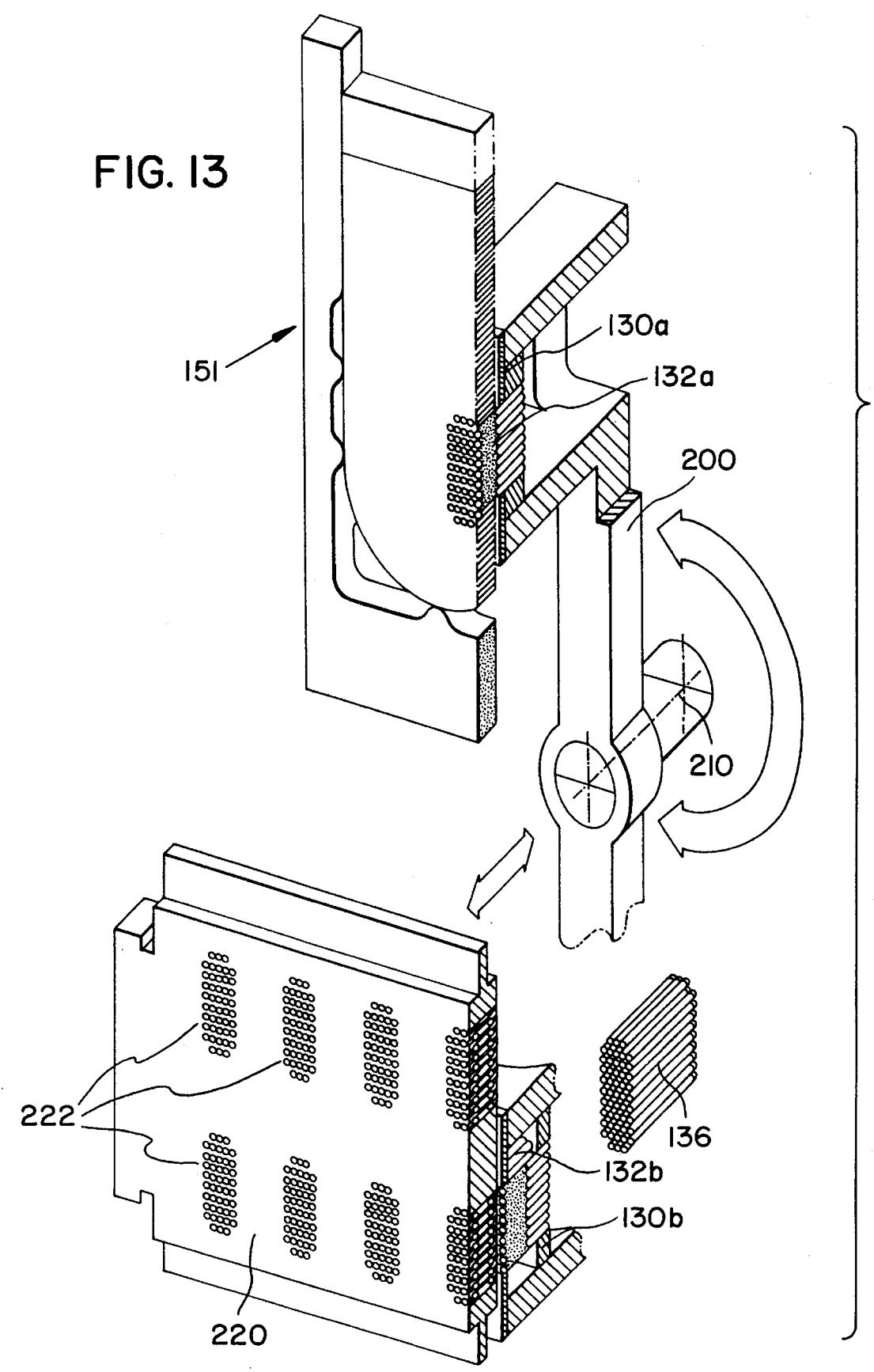
FIG. 13 is a schematic perspective view of a preferred tuft picking station.

The tuft picking device shown in FIG. 13 operates in the manner described above. In this embodiment of the tuft picking device, a pair of carrier blocks 130a, 130b are movably held in a two-armed holder 200 which is both movable about a horizontal axis 210 and movable along this axis. While block 130a is located in front of a bristle container 151 to have its tuft picking tubes filled with tufts of bristles, the other block 130b is located in front of a tuft collecting and carrier plate 220 which has a plurality of sets of tuft accommodation holes 222 formed therein. More specifically, the front ends of the tuft picking tubes 132b are aligned with one set of tuft accommodation holes 222. To transfer tufts of bristles contained in the picking tubes 132b into the tuft accommodation holes 222 of plate 220, plunger members 136 are introduced into the rear ends of the picking tubes 132b.

In yet another embodiment, the plunger members 136 move along with the picking tubes 132. Thus, relative motion only occurs to move picked bristle tufts into the through holes in plate 220.

When a set of tufts has been transferred from carrier 130b into a set of tuft accommodation holes 222, the collecting and carrier plate 220 is indexed to present a new set of accommodation holes 222 to the picking tubes 132a of carrier block 130a which, when a further set of tufts has been picked out from bristle container 151, is moved in front of plate 220 by a combined rotation and axial movement of the holder 200. Simultaneously, the empty tuft picking tubes 132b of carrier block 130b are moved in front of the bristle container 151 to pick out a further set of bristles.

When all sets of tuft accommodation holes 222 in the collecting and carrier plate 220 are filled with tufts of bristles, taken from the same bristle container 151 or from different bristle containers, plate 220 is moved to the mold so that the tuft accommodation holes are located in front of corresponding tuft insertion holes of the mold.

The embodiment of FIG. 14 is generally similar to that of FIG. 2, and like reference numerals are used to designate corresponding elements. However, in the embodiment of FIG. 14, the particular type of tuft picking station shown in FIG. 13 is used. Also, instead of the carrier cassettes 30 in the FIG. 2 embodiment, tuft collecting and carrier plates 220a, 220b, ... are used. In each of the tuft picking stations 125a, 125b, ..., only a selected fraction of a complete tuft pattern is filled into the holes of a tuft collecting and carrier plate. Since the bristle containers 151a, 151b, ... contain different types of bristles, each tuft pattern can thus be composed of any desired combination of tufts.

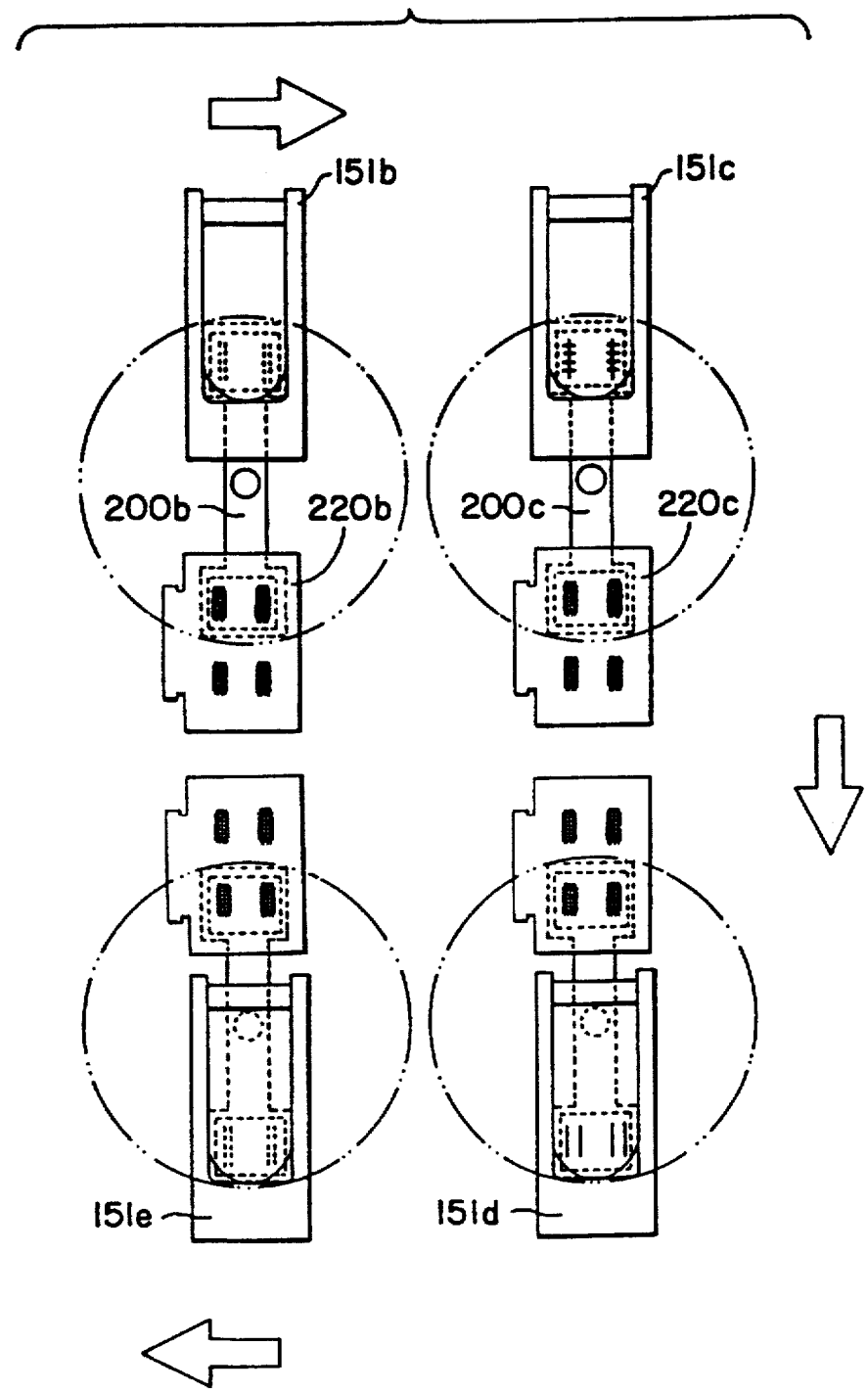

What is claimed is:

1. A brush making machine comprising a mold for injection molding of brush bodies having tufts of bristles embedded in the molding material, said mold comprising a mold part having a cavity defining surface portion with tuft insertion holes therein arranged in a pattern corresponding to a desired tuft pattern of the brush to be produced, and a tuft feeder being provided for introducing tufts of bristles into said holes so that the bristles project into said cavity, said tuft feeder comprising a plurality of tuft picking stations, each tuft picking station having an associated bristle container containing different pre-finished bristles in a parallel packed relationship and an associated tuft picker with a set of tuft picking tubes, and a plurality of tuft carriers movable between said tuft picking stations for carrying to said mold tufts of bristles picked out from said bristle containers by said tuft picking tubes.

2. The brush making machine of claim 1, wherein said carriers are sequentially moved through each of said tuft picking stations.

3. The brush making machine of claim 2, wherein said carriers are releasably connected in a closed loop to a common indexing drive.

4. The brush making machine according to claim 1, wherein each carrier after leaving the last one of said tuft picking stations passes to a carrier exchange station where each carrier loaded with tufts is exchanged for an empty carrier.

5. The brush making machine of claim 4, wherein each carrier before moving to said carrier exchange station passes through an inspection station where said carrier is inspected for detection of any missing or defective tufts of bristles.

6. The brush making machine of claim 4, wherein a robot is provided for removing an empty carrier from said mold, grasping a carrier loaded with tufts in said exchange station, leaving said empty carrier in said exchange station and moving said loaded carrier to said mold.

7. The brush making machine according to claim 1, wherein said mold parts comprise a plurality of closely spaced similar cavities in a predetermined arrangement and each of said carriers comprises a like number of sets of tuft picking tubes in a similar arrangement.

8. The brush making machine according to claim 1, wherein said carriers are each formed by a tuft collecting plate having a plurality of sets of tuft receiving holes formed therein corresponding to a like number of patterns of tuft insertion holes in said mold part.

9. The brush making machine of claim 1, wherein said picking tubes are held in a carrier block, moving means being provided for moving said carrier block in front of said bristle container and advancing said tubes until their front ends penetrate into said bristle container only a fraction of bristle length, and driving means being provided for repeatedly driving said tubes into said bristle container with a plurality of successive initial strokes and with at least one further stroke for advancing said tubes completely into said bristle container after all of said tubes have a tuft of bristles engaged therein.

10. The brush making machine according to claim 1, wherein said carriers are each formed by a cassette holding at least one set of tuft picking tubes, a tuft transferring station being provided next to said mold for transferring tufts of bristles from each cassette to said mold part.

11. The brush making machine according to claim 10, wherein said tuft picking and transfer tubes are held in each cassette in a manner permitting independent axial shifting of said tubes upon penetration into a bristle container and said cassettes are provided with releasable clamping means for clamping said tubes in fixed positions with respect to said cassette during transfer of tufts to said tuft loading station, driving means being provided for driving said tubes into said bristle container with a plurality of successive initial strokes whereby each tube is repeatedly advanced so that a front end thereof penetrates into said bristle container only a fraction of bristle length until a tuft of bristles is engaged therein, and with at least one further stroke for advancing said tubes further into said bristle container only when all of said tubes have a tuft of bristles engaged therein, said driving means comprising a reciprocating pusher member engaging the rear ends of said tubes.

12. The brush making machine according to claim 11, wherein each tuft picking station has a pusher member configured to selectively engage only the rear ends of a fraction of the tuft picking and transfer tubes in each carrier.

13. The brush making machine according to claim 1, wherein each of said bristle containers includes a flexible band engaged around a pack of bristles, said flexible band forming a generally U-shaped loop into the open side of which a movable pressure member is engaged to maintain said bristles under an at least substantially constant pressure.

14. The brush making machine of claim 1, wherein said carriers and said mold part having tuft insertion holes therein are adapted to be releasably connected with each other so that each tuft picking and transfer tube is aligned with a corresponding tuft insertion hole during tuft picking and tuft loading operations.

15. The brush making machine of claim 1, wherein each of the tuft picking stations is arranged for loading into said carrier only a selected fraction of tufts of a complete tuft pattern.

* * * * *

UNITED STATES PATENT AND TRADEMARK OFFICE
CERTIFICATE OF CORRECTION

PATENT NO. : 5,533,791
DATED : July 9, 1996
INVENTOR(S) : Bart G. Boucherie

Figure 14A:
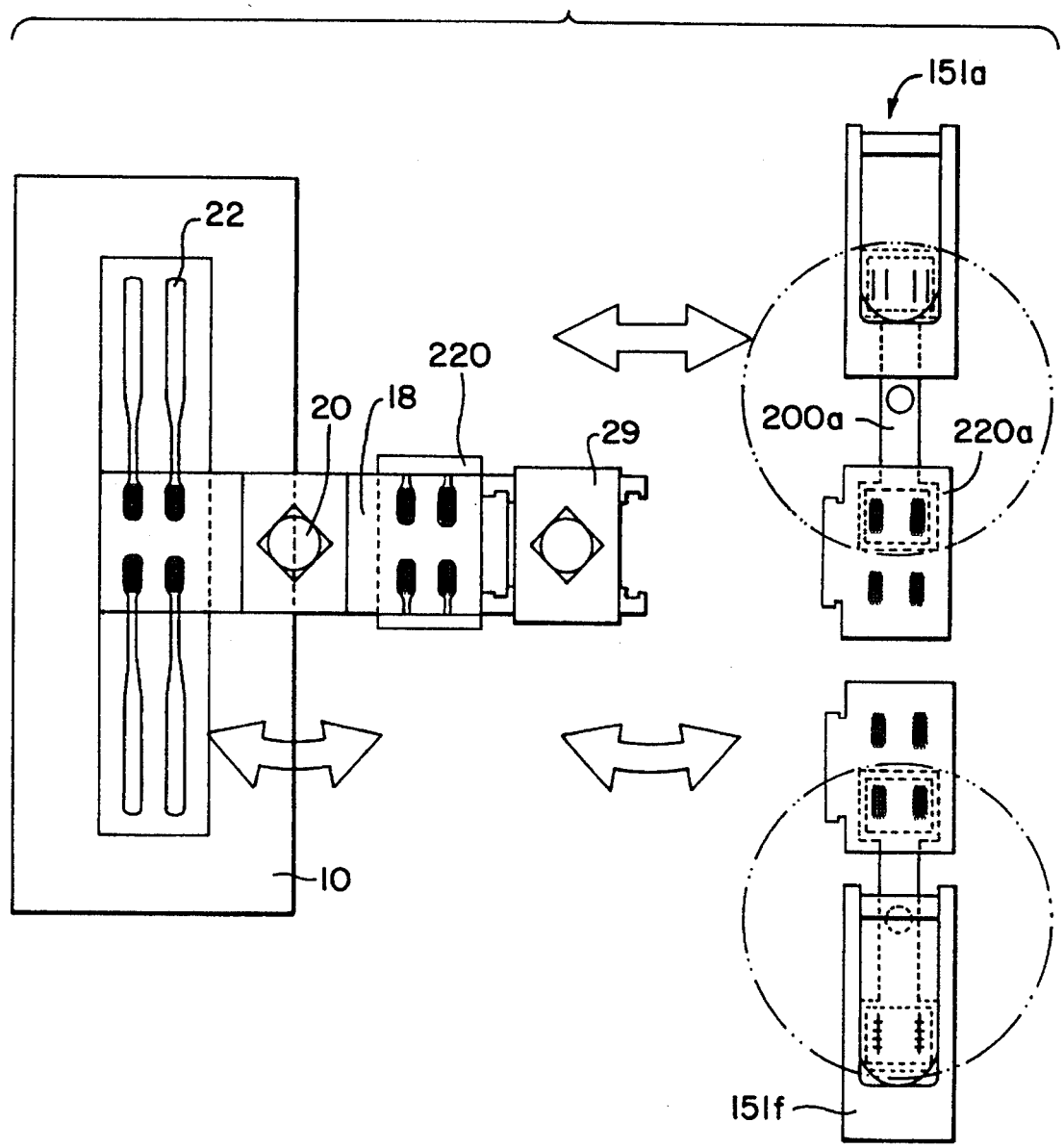
FIG. 14 is a schematic plan view of a preferred embodiment of the mold and tuft feeder.

It is certified that error appears in the above-indentified patent and that said Letters Patent is hereby corrected as shown below:

Col. 4, lines 11 and 12, change "FIG. 14 is a schematic plan view of a preferred embodiment of the mold and tuft feeder" to
--FIGS. 14A and 14B are schematic plan views of preferred embodiments of the mold and tuft feeder.

The drawing sheet consisting of Fig. 14B, should be added as shown on the attached page.

Signed and Sealed this

First Day of July, 1997

Attest:

BRUCE LEHMAN

Attesting Officer

Commissioner of Patents and Trademarks